United States Patent

Hargreaves et al.

Patent Number: 6,074,103
Date of Patent: Jun. 13, 2000

[54] ALIGNING AN OPTICAL FIBER WITH ELECTROLUMINESCENT SEMICONDUCTOR DIODES AND OTHER OPTICAL COMPONENTS

[75] Inventors: Donald C. Hargreaves, British Columbia, Canada; Tanya K. Oleskevich, Santa Clara, Calif.; Richard Barber, Ottawa, Canada

[73] Assignee: SDL, Inc.

[21] Appl. No.: 08/950,716

[22] Filed: Oct. 15, 1997

Related U.S. Application Data

[60] Provisional application No. 60/028,372, Oct. 15, 1996, and provisional application No. 60/042,809, Apr. 8, 1997.

[51] Int. Cl.$^7$ ....................................................... G02B 6/36
[52] U.S. Cl. ............................................. 385/90; 385/147
[58] Field of Search ................................. 385/88–94, 147

[56] References Cited

U.S. PATENT DOCUMENTS

| | | | |
|---|---|---|---|
| 4,108,529 | 8/1978 | Evans | 439/578 |
| 4,237,474 | 12/1980 | Ladany | 385/49 |
| 4,342,496 | 8/1982 | Hutter et al. | 439/578 |
| 4,702,547 | 10/1987 | Enochs | 385/88 |
| 4,798,439 | 1/1989 | Preston | 385/91 |
| 4,803,361 | 2/1989 | Aiki et al. | 250/227.24 |
| 4,883,342 | 11/1989 | Ishiii et al. | 350/96.2 |
| 4,884,015 | 11/1989 | Sugimoto et al. | 318/640 |
| 4,984,866 | 1/1991 | Boisgontier et al. | 385/49 |
| 4,997,253 | 3/1991 | Enochs | 385/88 |
| 5,026,138 | 6/1991 | Boudreau et al. | 385/51 |
| 5,029,971 | 7/1991 | Hunt et al. | 385/52 |
| 5,307,434 | 4/1994 | Blonder et al. | 385/91 |
| 5,425,119 | 6/1995 | Lee et al. | 385/86 |
| 5,430,819 | 7/1995 | Sizer et al. | 385/59 |
| 5,446,810 | 8/1995 | Watanabe et al. | 385/22 |
| 5,469,456 | 11/1995 | Rogers et al. | 372/43 |
| 5,513,290 | 4/1996 | Ishikawa et al. | 385/49 |
| 5,537,503 | 7/1996 | Tojo et al. | 385/93 |
| 5,611,014 | 3/1997 | Basavanhally | 385/90 |
| 5,793,915 | 8/1998 | Joyce | 385/91 |
| 5,857,047 | 1/1999 | Strand et al. | 385/88 |

OTHER PUBLICATIONS

S. Enochs, "A Packaging Technique to Achieve Stable Single–Mode Fiber to Laser Alignment," Proc. of SPIE, Sep. 1986, vol. 703, pp. 42–47.

*Primary Examiner*—Hung N. Ngo
*Attorney, Agent, or Firm*—Gallagher & Lathrop; David N. Lathrop

[57] ABSTRACT

Methods for aligning an optical fiber with an optical device mounted on a base include: establishing a first position of support near the optical component so as to achieve a substantially optimum alignment, then establishing a second position of support farther way from the optical component so as to refine the alignment; passing the optical fiber through an opening of a support member mounted on the base, moving the optical fiber within the extend of the opening to achieve a substantially optimum alignment, and then fixing the optical fiber to the support; and moving the optical fiber to achieve a substantially optimum alignment with the optical component, then fixing the optical fiber to a support in such a manner that any shift in position that occurs during the fixing is substantially along the optical axis of the optical fiber. Various embodiments of devices that have aligned optical fibers comprise: vertical support members that grip the optical along a distance that is less than or equal to about one-third the diameter of the optical fiber; supports that pivotally support the optical fiber; and supports that provide vertical surfaces orthogonal to the optical axis of the optical fiber for bonding a carrier of the optical fiber.

36 Claims, 10 Drawing Sheets

ALIGNING AN OPTICAL FIBER WITH ELECTROLUMINESCENT SEMICONDUCTOR DIODES AND OTHER OPTICAL COMPONENTS

CROSS-REFERENCE TO RELATED APPLICATIONS

This application claims priority of U.S. provisional application Ser. No. 60/028,372 filed Oct. 15, 1996 and U.S. provisional patent application Ser. No. 60/042,809 filed Apr. 8, 1997. The disclosures of these applications are incorporated herein by reference in their entirety.

GOVERNMENT LICENSE RIGHTS

The U.S. Government has a paid-up license in this invention and the right in limited circumstances to require the patent owner to license others on reasonable terms as provided for by the terms of contract No. DAAH01-96-C-R083 awarded by the Defense Advanced Research Projects Agency.

TECHNICAL FIELD

The present invention relates generally to optical components including optical fibers. In particular, the present invention relates to aligning optical fibers with other optical components such as electroluminescent semiconductor diodes, photosensitive transducers and optical waveguides.

BACKGROUND ART

The efficient operation of many optical devices requires very accurate alignment of various components. In semiconductor laser transmitters, for example, a misalignment of perhaps a fraction of micron between the semiconductor diode and an optical fiber can reduce transmitter efficiency by fifty percent or more. There is also a need for very accurate alignment of optical fiber with other optical components such as photosensitive transducers and waveguides.

Many known methods for achieving accurate alignment have been proposed but each method has undesirable limitations or costs. Some of the known methods use solder to fix optical fiber onto various substrates to secure an aligned relationship. Unfortunately, many of these methods require heating the components to such a high temperature that the semiconductor laser can no longer be operated safely. Since alignment tolerances are so critical, laser operation is essential to determine proper alignment.

One known method, such as that disclosed in U.S. Pat. No. 5,307,434, for example, overcomes this problem by fixing the optical fiber onto a layered structure that is insulated from the base supporting the laser; however, this solution is undesirable because of the costs required to form the insulating structure.

Many known methods that use solder and resins are also unattractive because the position of the optical fiber shifts as the solder cools or the resins cure, thereby moving the optical fiber out of optimum alignment.

DISCLOSURE OF INVENTION

It is an object of the present invention to provide a method for aligning optical fiber with an optical component more accurately and at lower cost than is possible with known methods.

Advantages offered by the present invention include alignment and fixation of optical fiber at temperatures that permit optical component to operate safely, elimination or at least great reduction in the alignment shift of optical fiber as its position is fixed, and the ability to make fine adjustments in optical fiber alignment.

In accordance with the teachings of one aspect of the present invention, a method for aligning an optical fiber with an optical component mounted on a base comprises establishing a first position of support close to the optical component to achieve a substantially optimum alignment, and then establishing a second position of support farther from the optical component to refine the alignment.

In accordance with the teachings of another aspect of the present invention, a method for aligning an optical fiber with an optical component mounted on a base comprises passing the optical fiber through an opening of a support member mounted on the base, moving the optical fiber within the extent of the opening to achieve a substantially optimum alignment of a first end of the optical fiber with the optical component, and then fixing the optical fiber to the support member.

In accordance with the teachings of yet another aspect of the present invention, a method for aligning an optical fiber with an optical component mounted on a base comprises moving the optical fiber to achieve a substantially optimum alignment of a first end of the optical fiber with the optical component, and fixing the position of support in a manner that any shift in the position occurs in a direction that is substantially collinear with the optical axis of the optical fiber.

In accordance with a further aspect of the invention, a device comprises a base carrying an optical component and a support member, and an optical fiber supported by the support member such that a first end of the optical fiber is held in proximity to and in alignment with the optical component, and the support member grips the optical fiber within an interval along the optical fiber less than or equal to about one-third the diameter of the fiber.

In accordance with yet a further aspect of the invention, a device comprises a base carrying an optical component, a first support member and a second support member, and an optical fiber pivotally supported at the first support member and supported at the second support member such that a first end of the optical fiber is held in proximity to and in alignment with the optical component.

In accordance with another aspect of the invention, a device comprises a base carrying an optical component and a support member, and an optical fiber supported by the support member such that a first end of the optical fiber is held in proximity to and in alignment with the optical component, and the optical fiber is attached to a carrier bonded to a surface of the support member that is substantially orthogonal to the optical axis of the optical fiber.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

Overview

Structure

Figure 1:
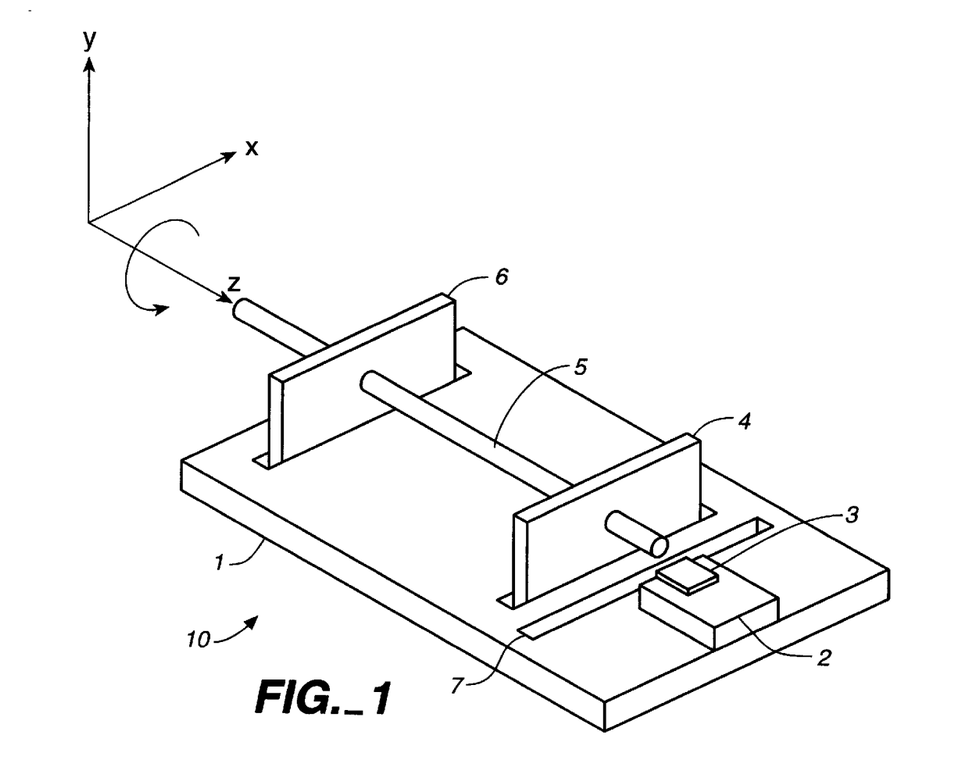
FIG. 1 is a schematic representation of one embodiment of a device according to the present invention.

FIG. 1 is a schematic representation of one embodiment of device 10 according to the present invention. In this embodiment, optical component 3 is mounted on base 1 by means of substrate 2. In the illustration, optical component 3 portrays an electroluminescent semiconductor diode or laser; however, the present invention may be practiced with a wide variety of components such as photosensitive transducers like photodiodes, optical amplifiers and optical waveguides including optical fibers.

Base 1 may be constructed from a wide variety of materials including various silicon compositions, ceramics and metals. Preferably, for laser applications, base 1 has high thermal conductivity to assist in dissipating heat from optical component 3 and has a low coefficient of thermal expansion (CTE) to provide good dimensional stability over a wide range of operating temperatures.

Substrate 2 may also be constructed from a wide variety of materials. In principle, substrate 2 is optional to practice the present invention but it may be useful in many devices to provide, for example, an electrical contact needed to operate optical component 3, and to separate optical component 3 from base 1 by a distance sufficient to allow an optical fiber to be aligned properly. Preferably, when it is used, substrate 2 has a CTE that is matched with the CTE of support member 4 and support member 6.

Support member 4 provides support for optical fiber 5 at a first position that is relatively close to optical component 3. It supports optical fiber 5 in a manner that restricts fiber movement in the X-Y plane but preferably, during alignment, restricts neither movement along the Z axis nor rotation about the Z axis. Also, preferably during alignment, support member 4 allows optical fiber 5 some freedom to pivot about the first position. Support member 4 may be constructed from a variety of materials, which are discussed more fully below. An essential feature is that support member 4 have sufficient structural integrity to provide stable support for optical fiber 5.

Figure 2A:
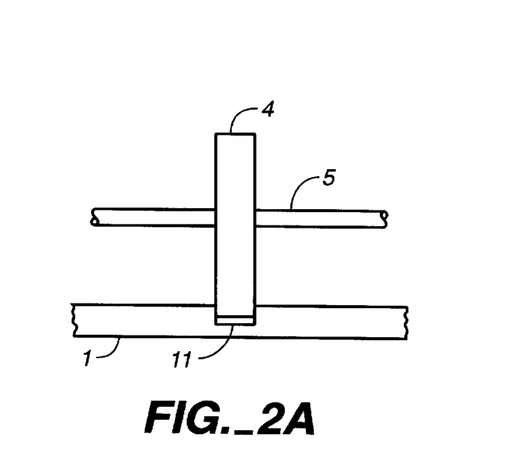
FIGS. 2a and 2b are schematic representations of two ways in which a support member may be mounted to a base.
Figure 2B:
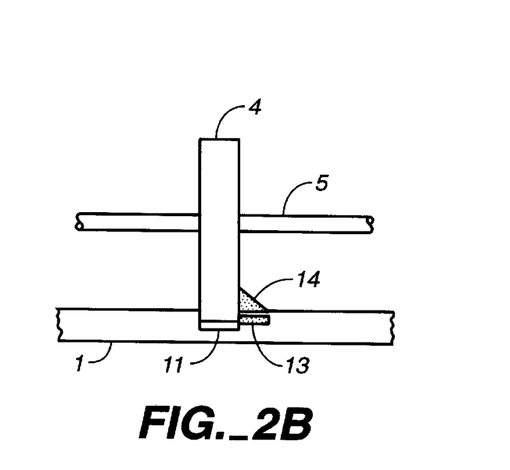

Support member 4 may be mounted on base 1 in a number of ways. It may be mounted to the surface of base 1 using solder, resins or other fixing techniques according to known practice. It may be mounted to other substrates, not shown in any figure, or it may be mounted in slots or trenches formed in base 1. Referring to FIG. 2a, support member 4 is mounted in trench 11 and fixed in position by an interference fit. In another example shown in FIG. 2b, support member 4 is mounted in trench 11 and held in place by solder 14 that is melted by resistive heating element 13.

Optical fiber 5 may be a single-mode or a multi-mode fiber of various known compositions. In many applications, performance is enhanced by forming a lens on the end of optical fiber 5 proximate to optical device 3; however, this feature is not required to practice the present invention. A separate lens, not shown in any figure, may also be used.

Support member 6 provides support for optical fiber 5 at a second position that is farther from optical component 3 than is the first position. It supports optical fiber 5 in a manner that restricts movement of the fiber in the X-Y plane. It need not restrict movement along the Z axis or rotation about the Z axis. Support member 6 may be constructed from a wide variety of materials and may be mounted to base 1 in a number of ways. Preferably, the CTE of support member 6 matches the CTE of support member 4.

In the embodiment shown, the structures and mounting arrangements of support member 4 and support member 6 are identical; however, they may be very different. Support member 6 may be formed and used according to known support techniques.

The second position of support provided by support member 6 can provide strain relief and it also can be used to adjust the alignment of optical fiber 5 more precisely than can be accomplished at the first position of support. The ability to make fine adjustments to alignment is discussed more fully below.

Trench 7 acts as a thermal barrier between optical component 3 and any soldering that may be used to construct and align device 10. It is not needed to practice the present invention.

A number of features that are important in many practical embodiments are not shown for the sake of clarity. Examples of features that are not shown include resistive heaters that may be etched or otherwise formed into various components to assist in soldering, electrical leads to optical component 3, and electrical and thermal insulating pads.

Alignment

Preferably, alignment is performed in two steps. The first step establishes the first position of support near optical device 3 so as to achieve a substantially optimum alignment between optical fiber 5 and optical component 3. In practice, the first position of support is established while operating optical device 3 and measuring performance so that changes in performance can be used to identify an optimum position. If optical device 3 is a laser, for example, light conveyed from the laser by optical fiber 5 is measured. If optical device 3 is a photodiode, for example, light received by the photodiode from optical fiber 5 is measured.

If solder or resin is used to fix the position of support member 4, the actual position of support member 4 may shift slightly as the solder cools or the resin cures. Furthermore, if solder or some other high-temperature method is used and the CTE of various components are not properly matched, the position of optical component 3 may change relative to the first position of support as materials contract while cooling.

The second step of a preferred alignment method corrects for these shifts in position by establishing the second position after the first position of support is established. According to this method, optical fiber 5 pivots about the first position of support as the second position of support is changed. Because the second position of support is farther away from optical component 3, shifts in position that occur as the second position is fixed do not degrade alignment as severely as do shifts in the first position.

Positions of support may be established in a wide variety of ways, as discussed more fully below. Generally, these positions may be established by moving and fixing support members or, alternatively, support members with an appropriate structure may be fixed and optical fiber 5 moved appropriately and fixed to the support members.

Fiber Supports

Optical fiber 5 may be supported in a variety of ways that offer different advantages depending on the type of material that is used to construct the support.

Precision Hole

Figure 3A:
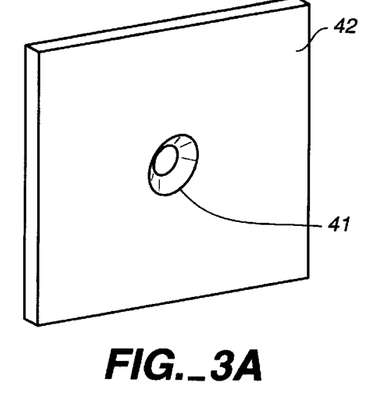
FIGS. 3a and 3b are schematic representations of a support member with a hole for receiving an optical fiber.

One way, illustrated in FIG. 3a, entails forming in support 42 a hole 41 that has a diameter essentially equal to the diameter of optical fiber 5. Support 42 may be a support member mounted on base 1 as discussed above or it may be a carrier of optical fiber 5 that is attached to a support member. Various forms of carriers are discussed below. Preferably, as shown, hole 41 is tapered to facilitate insertion of optical fiber 5 into hole 41, and to minimize damage to the optical face of the fiber. Preferably, to allow optical fiber 5 to pivot, the portion of support 42 that grips or contacts optical fiber 5 extends along the length of the fiber by a distance that is no more than about one-third the fiber diameter.

Single-mode optical fibers, for example, that are devoid of a jacket or protective covering typically have a diameter of about 125 microns ($\mu$m). The precision required for the hole diameter is typically no more that about ±1 $\mu$m, which may be difficult to achieve with some manufacturing processes.

A process known as electroforming may be used to fabricate a metallic structure referred to herein as an electrofoil. Electrofoils may be formed with features such as holes that have dimensional tolerances less than one micron. In this electrolytic process, electrofoils are plated onto a number of photographically-produced conductive patterns formed on an electroform wafer. After the electrofoils have been plated to a desired thickness, they may be stripped away from the photographic patterns. Preferably, the electrofoils are formed with a thickness between 50 $\mu$m and 250 $\mu$m; however, dimensional precision deteriorates as the thickness increases.

Unfortunately, the electrolytic process may impart a Gaussian distribution to the dimensions of the electrofoil across the electroform wafer. In such cases, only components taken from a constant radius from the center of the wafer will have the same dimensions; therefore, the yields obtained by electroforming may not be high enough to make this technique cost effective.

Figure 3B:
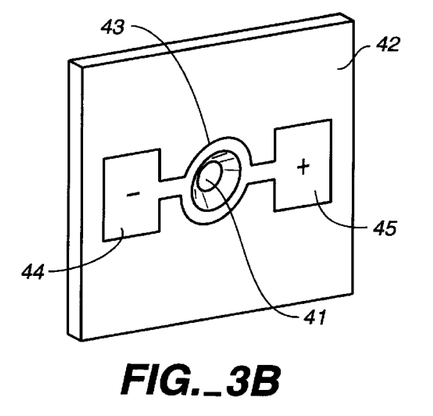

Alternatively, holes of sufficient precision may be formed in ceramic plates by laser drilling, for example, and may be formed in silicon by wet chemical etching or by dry etching. FIG. 3b illustrates one structure that may be used to fix an optical fiber to support 42 with solder after the fiber has been aligned. Solder 43 may be sputtered on to support 42, for example, and subsequently melted by a current passed between terminals 44 and 45. Fixation by solder or other means may be desirable to enhance the mechanical stability of the support but it is not required to practice the present invention.

Elastic Gripping Members

Another way to support optical fiber 5 is by way of elastic members formed in materials like metallic foils. The formation of the elastic members does not require as high a precision as the formation of a hole as discussed above because the range of deformation provided by the elastic members compensates for errors in the manufacturing process. As a result, low-cost high-volume manufacturing techniques can be used to produce support members providing high-positional accuracy.

Figure 5A:
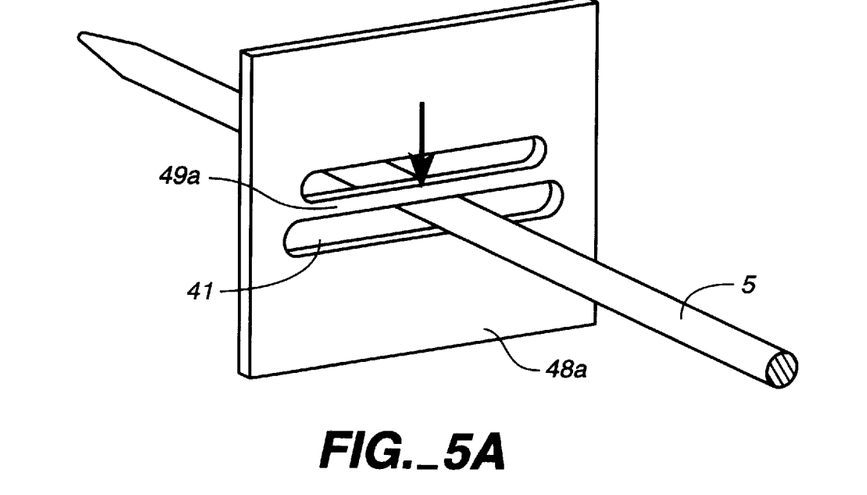
FIGS. 5a through 5g are schematic representations of elastic members formed in a carrier or support member to support an optical fiber.

Some examples are illustrated in FIGS. 5a through 5g. In FIG. 5a, two slots in carrier 48a form elastic member 49a. When optical fiber 5 is inserted through opening 41 in the lower slot, it causes member 49a to deflect upward. The elastic property of the member causes it to exert a force on optical fiber 5 in the direction of the arrow.

Figure 5B:
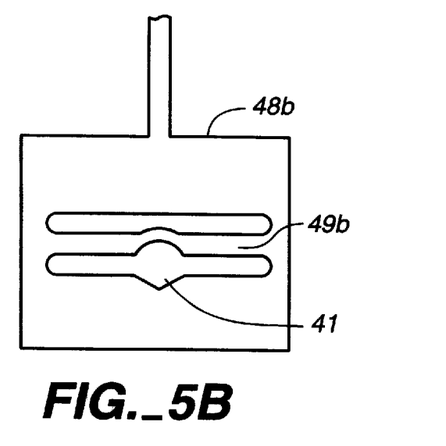
Figure 5C:
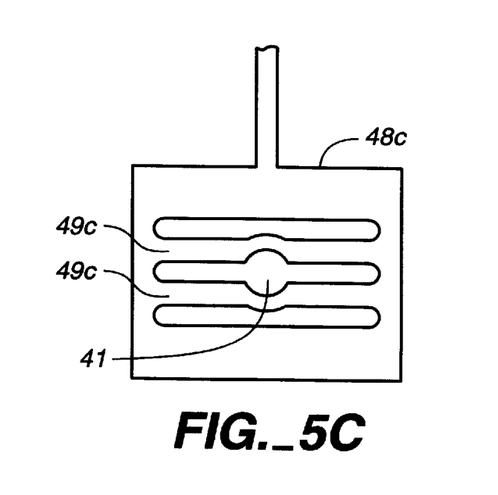

Two variations are shown in FIGS. 5b and 5c. In FIG. 5b, support 48b comprises elastic member 49b formed by two slots and circular opening 41 is formed in the lower slot to facilitate insertion of optical fiber 5. In FIG. 5c, three slots in support 48c form two elastic members 49c. When optical fiber 5 is inserted through circular opening 41 between the members 49c, they are deflected away from one another and exert a force against the fiber. The tabs formed at the top of supports 48b and 48c may be used to grip the supports when adjusting the alignment of optical fiber 5. This will be discussed further below.

Figure 5D:
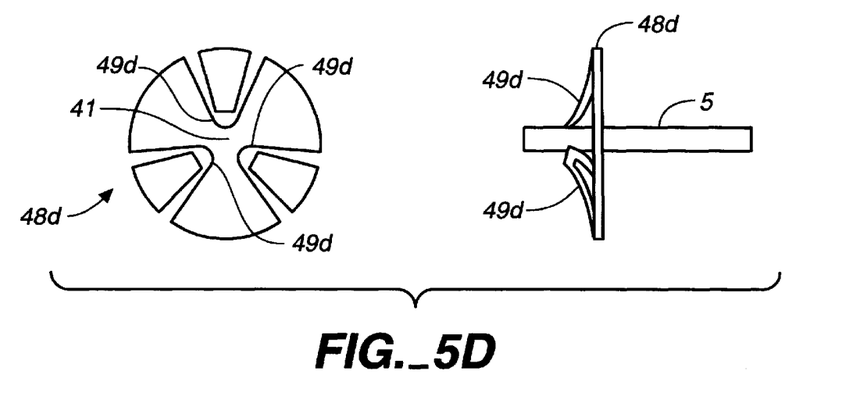
Figure 5E:
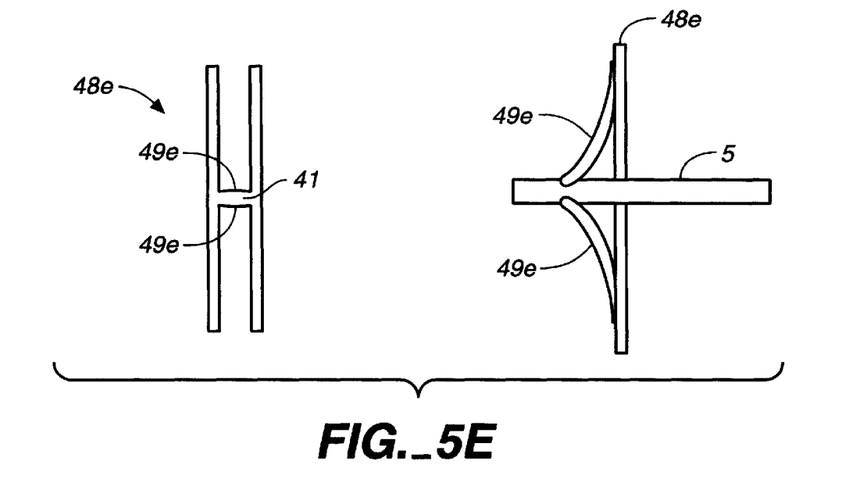
Figure 5F:
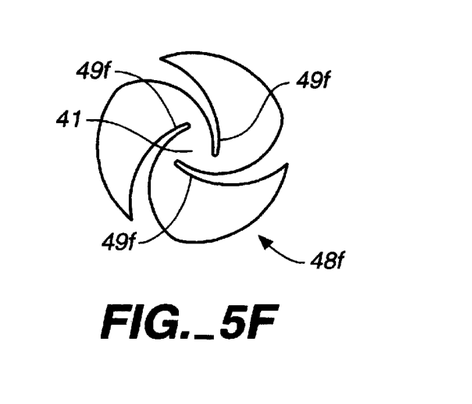
Figure 5G:
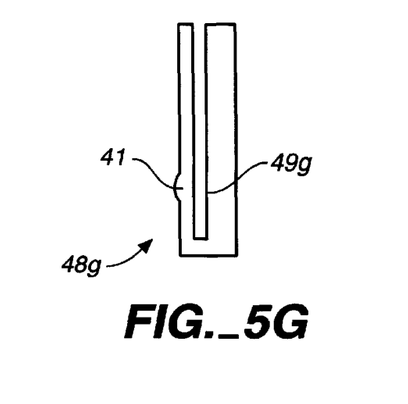

Additional embodiments are shown in FIGS. 5d through 5g. In FIG. 5d, three elastic members 49d are formed in a radial pattern around opening 41 in support 48d; the insertion of optical fiber 5 causes these elastic members to flex upward and out of the plane of support 48d, thereby exerting a force against optical fiber 5 and supporting it in position. In FIG. 5e, two opposing elastic members 49e are formed on opposite sides of opening 41 in support 48e; the insertion of optical fiber 5 causes these elastic members to flex upward and out of the plane of support 48e, thereby exerting a force against optical fiber 5 and supporting it in position. In FIG. 5f, three elastic members 49f are formed in an iris pattern around opening 41. In FIG. 5g, one elastic member 49g is formed as a swinging arm. The insertion of optical fiber 5 in circular opening 41 in the channel to the left of elastic member 49g causes it to deflect to the right, thereby exerting a force against optical fiber 5. As these examples show, many variations are possible.

The elastic members apply a force against optical fiber 5 that is sufficient to restrain movement of the fiber in the X-Y plane, as shown in FIG. 1, yet allow the fiber to move along the Z axis and to rotate about the Z axis.

Elastic Layer

Figure 4A:
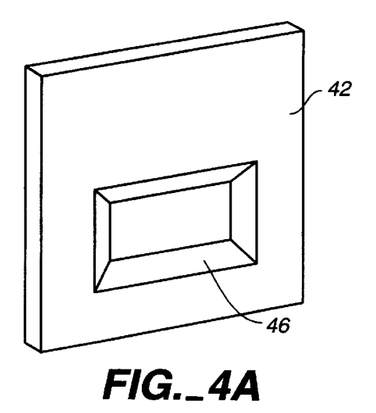
FIGS. 4a and 4b are schematic representations of a support member with a large opening and a layer of elastic material covering the opening.
Figure 4B:
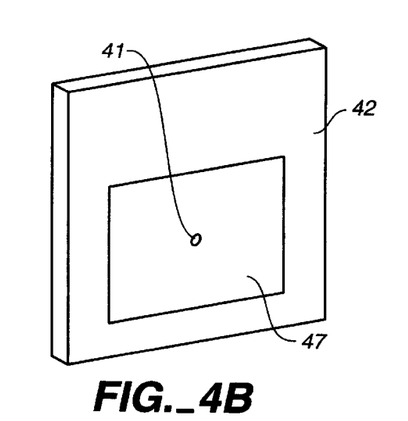

Elastic members may also be formed in another way as illustrated in FIGS. 4a and 4b. As shown in FIG. 4a, opening 46 is formed in support 42. A layer of elastic material 47 is applied to support 42 so as to cover opening 46 and an opening 41 is formed in elastic coating 47. Opening 41 is formed in such a way as to provide either a precision hole or one or more elastic members. Several examples are illustrated in FIGS. 4c through 4j. As these examples show, a wide variety of openings may be formed. Opening 46 as shown in FIG. 4a is rectangular. Rectangular shapes are convenient in many implementations; however, other shapes including but not limited to circles and ovals may be used to the practice of the present invention.

Figure 4C:
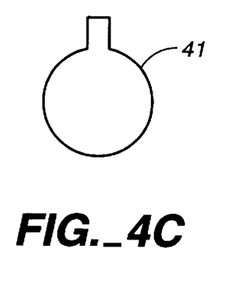
FIGS. 4c through 4j are schematic representations of an opening formed in a layer of elastic material.
Figure 4D:
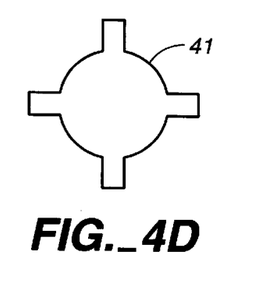
Figure 4E:
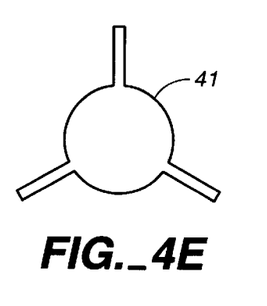
Figure 4F:
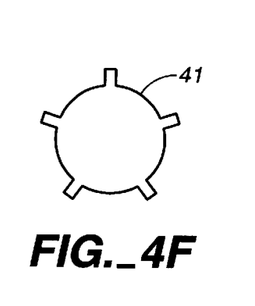
Figure 4G:
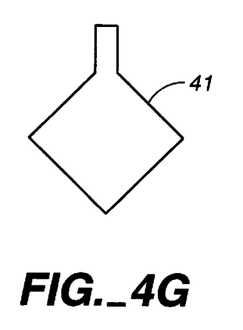
Figure 4H:
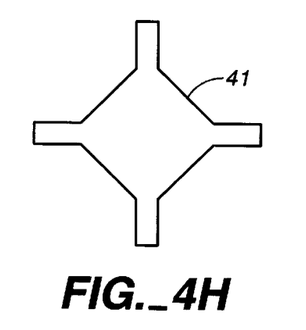
Figure 4I:
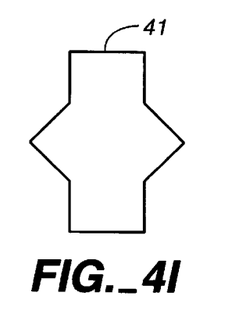
Figure 4J:
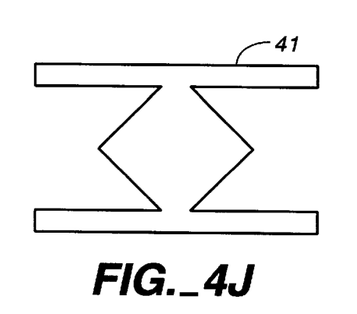

In FIG. 4c, opening 41 is essentially a hole with a single slot. The examples in FIGS. 4d through 4f illustrate holes with varying numbers and widths of slots. A slot geometry may be chosen to facilitate deformation of elastic material 47. In FIG. 4g, opening 41 is essentially a square with a single slot formed at one corner. The examples in FIGS. 4h through 4j illustrate squares with varying numbers, widths and orientations of slots. Many other configurations are possible.

A wide variety of polyamides may be used to form the layer of elastic material 47, but no particular material is critical to the practice of the present invention. The important qualities for the layer of material is that it be thin enough to facilitate formation of opening 41 yet be sufficiently strong and elastic to provide a stable support for optical fiber 5.

Vertical Trap

Figure 6:
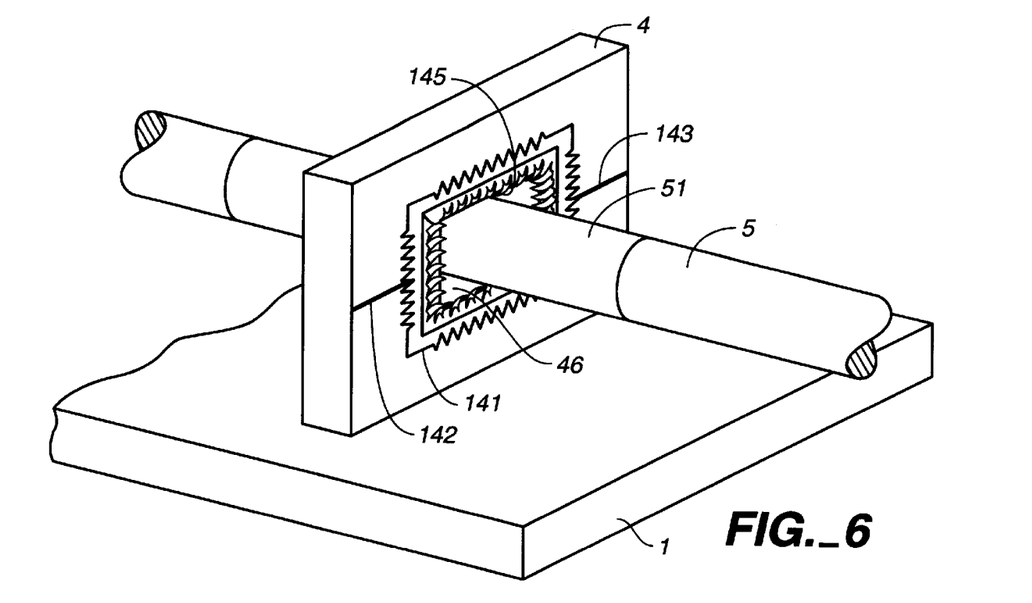
FIGS. 6 through 8 are schematic representations of optical fiber in position for alignment and attachment to support members according to the present invention.

FIG. 6 illustrates supporting optical fiber 5 within opening 46 formed in support member 4. Carrier 51 is formed on optical fiber 5, such as by metalization or by a metalized sheath. A means for fixing the position of optical fiber 5 is applied to either or both of carrier 51 and support member 4 around opening 46. Opening 46 is formed in such a manner that optical fiber 5 is allowed to pivot. After optical fiber 5 is aligned, its position and orientation with respect to support member 4 is fixed.

Fixation of the fiber may be accomplished in essentially any manner including the use of solder. In the example illustrated in FIG. 6, resistive heater 141 is formed around opening 46 and coupled terminals 142 and 143 are formed on either side of opening 46. This heater may be used to melt solder 145 deposited on support member 4, or to melt solder on carrier 51. Essentially any form of heating, such as by radiation, may be used. Carrier 51 can be eliminated if the solder that is used is able to bond directly to optical fiber 5.

Support Member And Carrier

The preceding description of ways for supporting a fiber generally assume the use of an embodiment of support member 4 that is manipulated to align optical fiber 5 prior to the support member being mounted to base 1. The ways that are described below assume the use of an embodiment of a support member that is mounted on a base prior to aligning the optical fiber. Each of these ways assume a large opening is formed in the support member and that a carrier for the optical fiber is attached to a "vertical" surface of the support member. In this context, the term "vertical" refers to the orientation of a plane that is substantially orthogonal to the optical axis of the optical fiber.

External Surface

Figure 7:
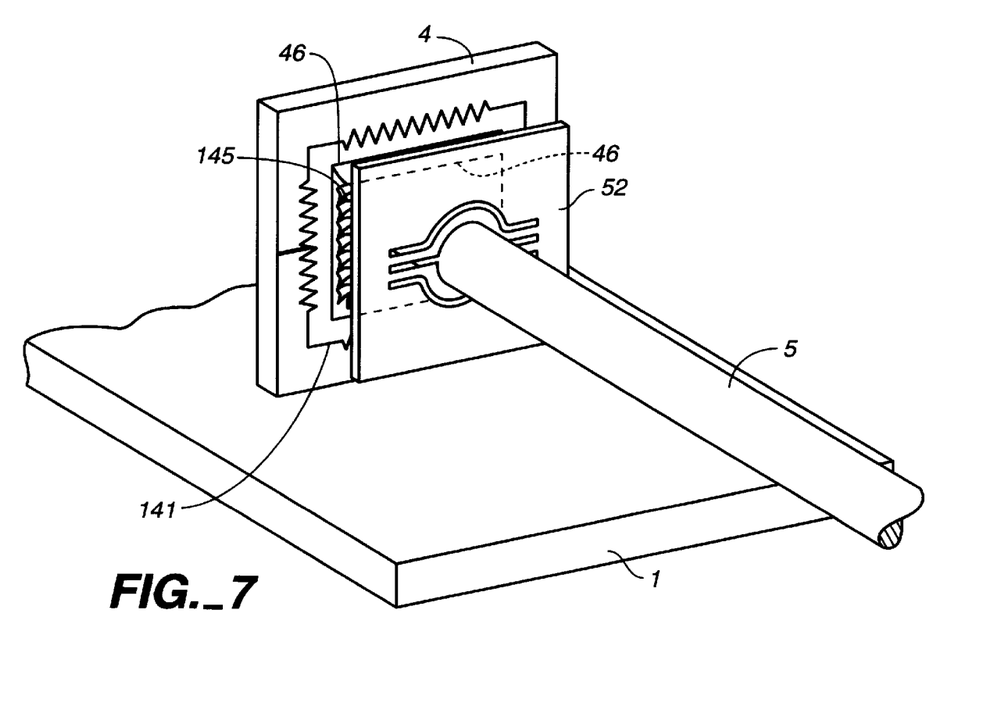

Referring to FIG. 7, carrier 52 provides direct support for optical fiber 5. In the embodiment shown, carrier 52 is in the form of support 48c shown in FIG. 5c. Carrier 52 may be implemented in a wide variety of ways including the supports illustrated in FIGS. 3a and 3b, FIGS. 4a through 4j, and FIGS. 5a through 5g. No particular implementation is critical so long as it provides a stable support for optical fiber 5 and, preferably, permits some degree of pivoting around the position of support.

During alignment, carrier 52 is manipulated or, alternatively, optical fiber 5 is manipulated directly to bring carrier 52 into contact with an external vertical surface of support member 4 and to align optical fiber 5 with optical component 3. When proper alignment is achieved, carrier 52 is bonded to a vertical surface of support member 4. The bonding may be accomplished in essentially any manner such as by soldering. As shown in the figure, solder 145 is applied to support member 4 around opening 46 and resistive heater 141 is formed near opening 46 to facilitate melting solder 145. Alternatively, solder could be applied to carrier 52 and carrier 52 heated by some means such as radiation, thermal conduction or a current flowing through carrier 52.

If carrier 52 permits optical fiber 5 to pivot, the alignment of optical fiber 5 may be refined by subsequently establishing a second position of support at support member 6, as discussed above. By attaching carrier 52 to a vertical support, however, the need for subsequent refinement is greatly reduced. Any shift in the first support position as the fiber is fixed, for example, as solder cools, will tend to be in the Z direction along the optical axis of optical fiber 5. Errors in alignment that are caused by shifts in the Z direction do not degrade optical performance nearly as much as errors that are caused by shifts in the X or the Y directions.

Internal Surface

Figure 8:
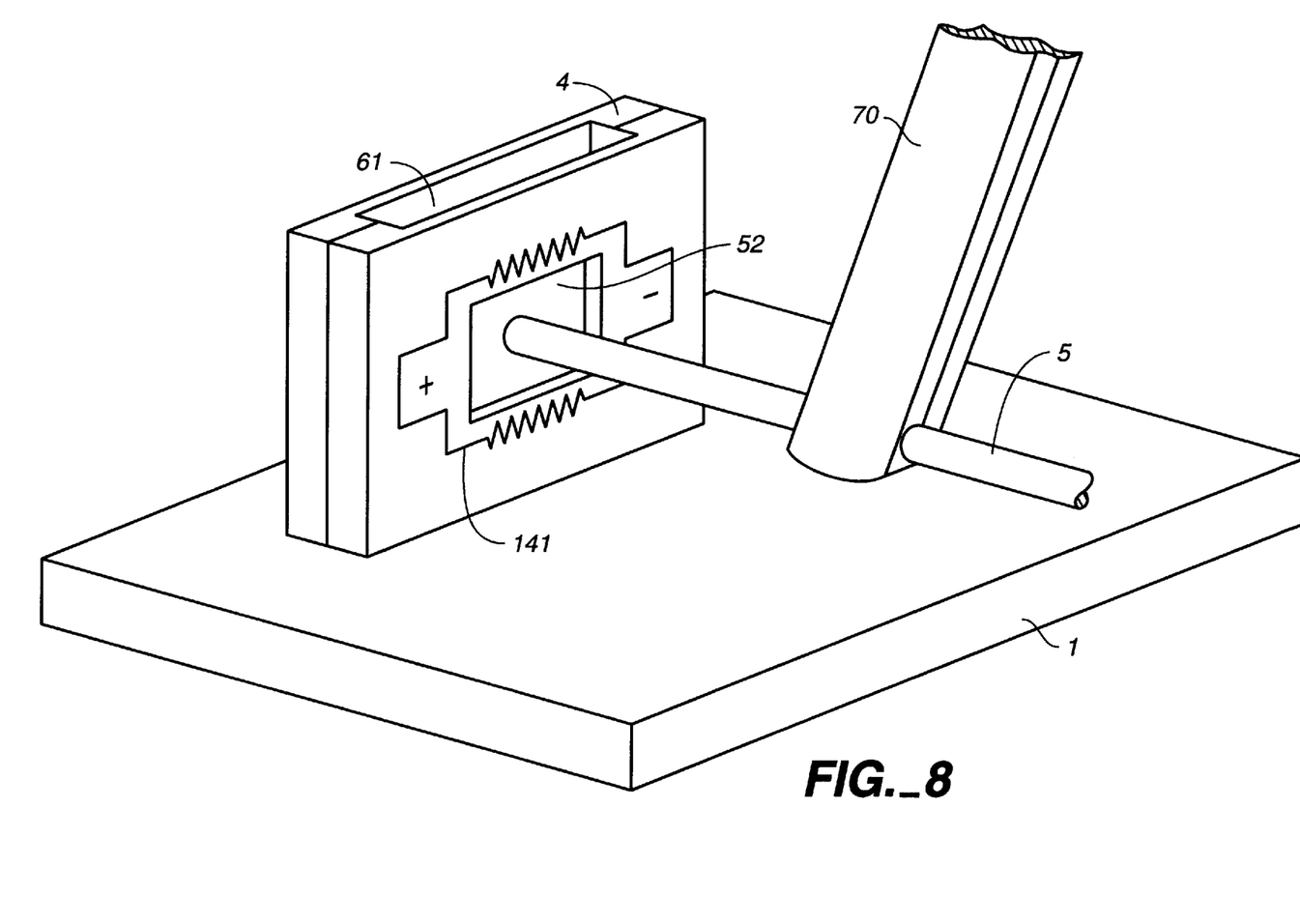

Carrier 52 may also be attached to an internal vertical surface of support member 4 in any of several ways. One of these ways is shown in FIG. 8, where slot 61 provides support member 4 with at least one internal vertical surface. Although it is anticipated that slot 61 will generally provide two internal vertical surfaces, there is no requirement that slot 61 provide more than one internal vertical surface for bonding. Carrier 52 may be formed according to any of the ways discussed above.

Figure 9A:
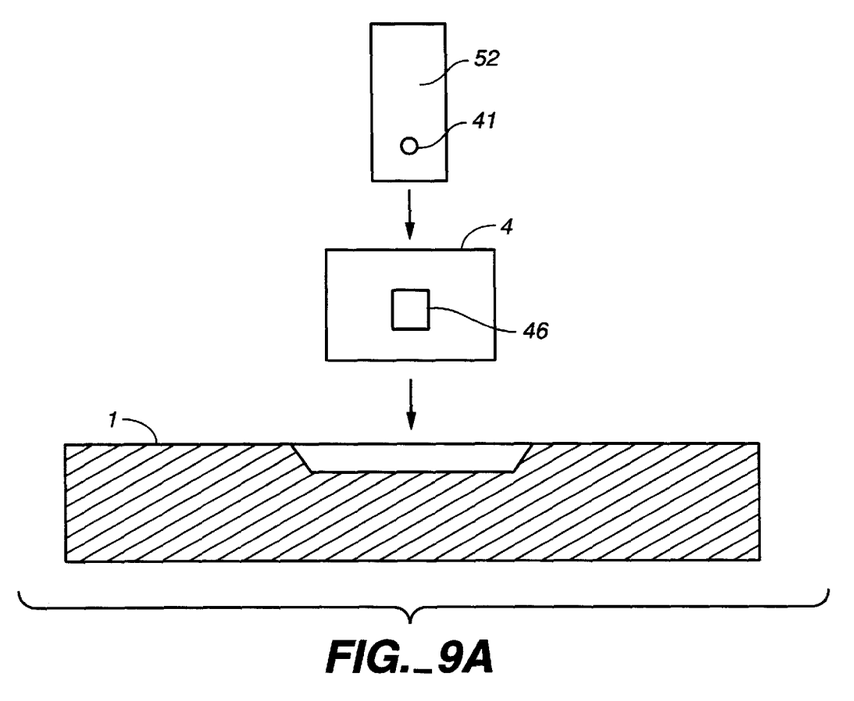
FIGS. 9a, 9b, 10a, 10b and 11 are schematic representations of various embodiments of support members according to the present invention.

Construction and alignment may be accomplished as shown in FIG. 9a. After support member 4 is mounted to base 1, carrier 52 is inserted into slot 61 so that opening 41 is exposed through opening 46, optical fiber 5 is inserted through opening 41, and then optical fiber 5 is aligned with optical component 3. If carrier 52 is large enough to extend out of slot 61 above the top of support member 4, perhaps having tabs such as those shown in FIGS. 5b or 5c, it may be gripped and manipulated to align optical fiber 5. Alternatively, optical fiber 5 may be gripped and manipulated directly. For example, FIG. 8 illustrates tweezers 70 gripping optical fiber 5. After alignment is achieved, carrier 52 is fixed to support member 4 using any of several ways discussed below.

Figure 9B:
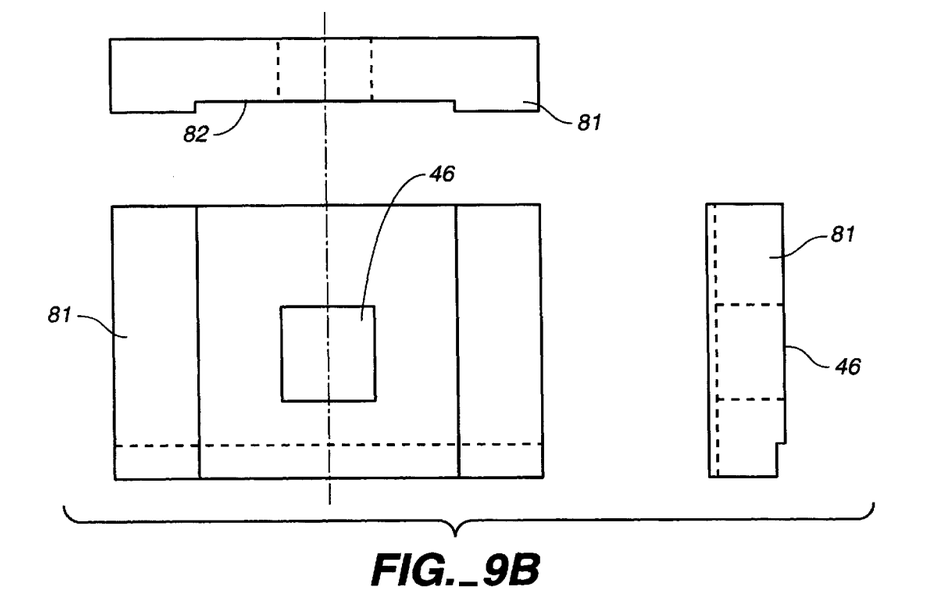

FIG. 9b illustrates additional detail for one embodiment of support member 4. This embodiment includes two sections 81 made of silicon, ceramic or metal, for example. Each section contains trench 82 and opening 46. Support member 4 is formed by bonding together the two sections 81 so that the sides with trenches face one another to form slot 61. As shown in FIG. 9a, support member 4 may be mounted in a trench formed in base 1. If solder is used for mounting, it should have a higher melting temperature than any solder that is used to fix the alignment of optical fiber 5. For example, AuGe solder having a melting temperature of about 356° Celsius may be used to mount support member 4 to base 1, and AuSn solder having a melting temperature of about 286° Celsius may be used to fix the alignment of optical fiber 5.

Carrier 52 may be fixed to support member 4 by soldering it to a vertical surface in slot 61. Preferably, the solder is applied to carrier 52 by sputtering, for example, before carrier 52 is inserted into slot 61. The embodiment illustrated in FIG. 8 includes resistive heater 141 that may be used to melt this solder after alignment is achieved. The solder may be melted by heat obtained from any suitable source. In alternative embodiments, resistive heaters may be formed within trench 82 for either or both sections 81.

Figure 10A:
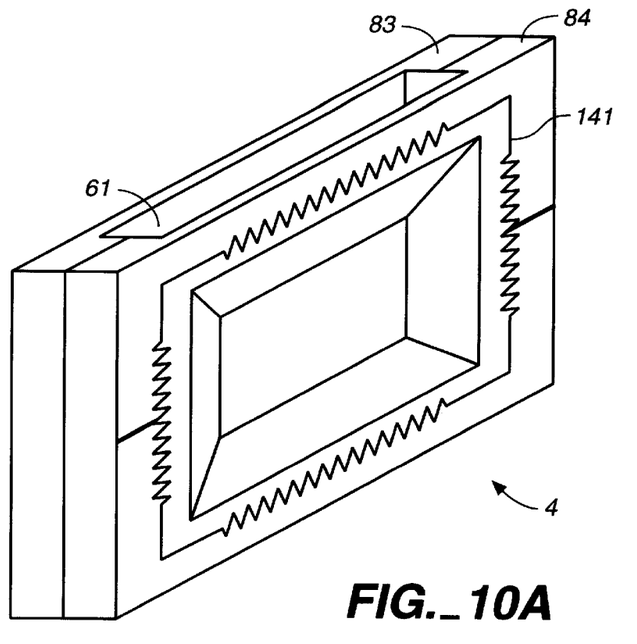
Figure 10B:
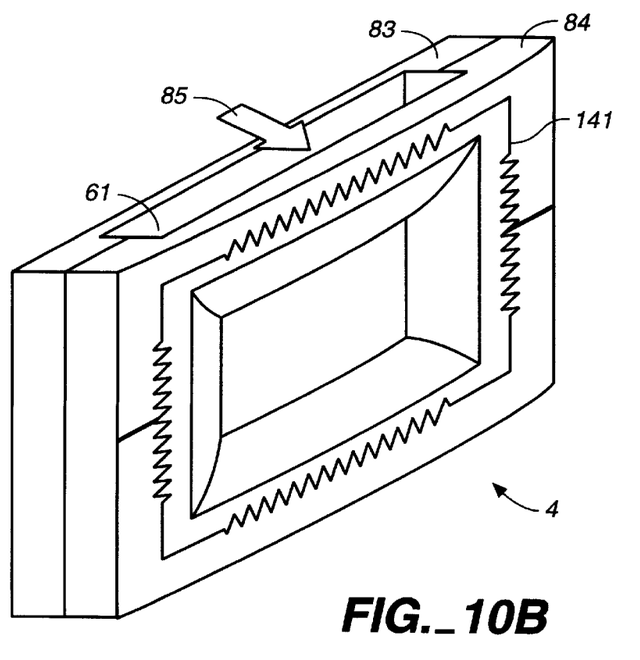

Carrier 52 may be fixed to support member 4 by force exerted on carrier 52 by opposing surfaces in slot 61. This may be accomplished by the embodiment shown in FIG. 10 which includes sections 83 and 84 with slot 61 formed between them in a manner similar to that described above. In this embodiment, however, the distance between the two sections in all or part of slot 61 is less than the thickness of carrier 52. Section 84 includes resistive heater 141 and preferably is made of a material that has a CTE greater than the CTE of the material constituting section 83.

During an alignment procedure, section 84 is heated by applying a current to heater 141. As the temperature of section 84 increases, section 84 expands to a greater extent than does section 83; however, because the two sections are bonded at their edges, section 84 bulges outward in the direction of arrow 85, causing the opposing faces in slot 61 to spread apart. Carrier 52 is inserted into the slot, optical fiber 5 is inserted through hole 41 in carrier 52, and alignment is carried out as described above. When optical fiber 5 is aligned with optical component 3, current is removed from heater 141 and section 83 is allowed to cool and return to its original shape. As it does so, the opposing faces in slot 61 come together and apply force on carrier 52, fixing it in position.

Figure 11:
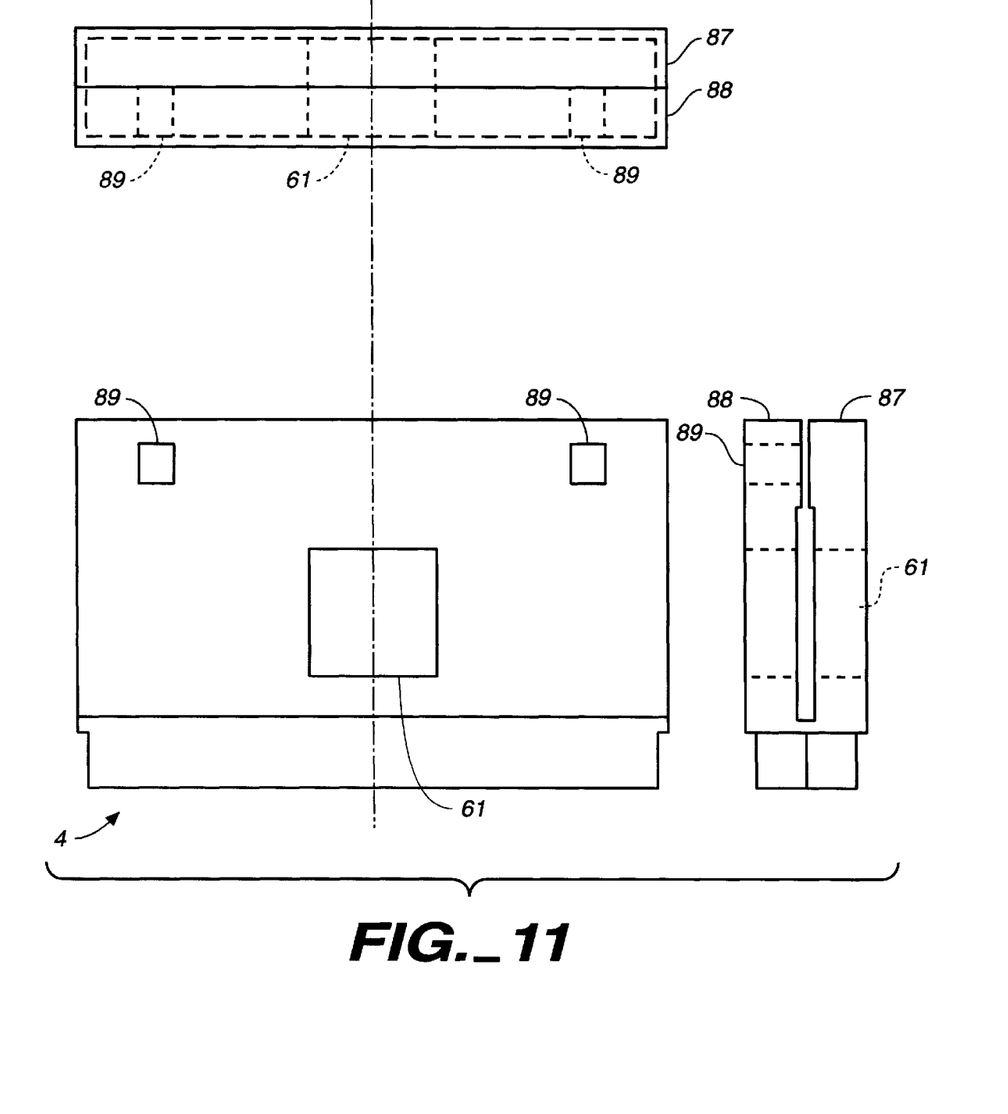

In an alternative embodiment illustrated in FIG. 11, carrier 52 is also fixed by force from opposing internal faces in support member 4; however, in this embodiment, the opposing faces are spread apart by force. In this embodiment, sections 87 and 88 are not bonded together at the edges or top. Holes 89 are formed in section 88 so that pressure may be applied to the inside surface of section 87 and open a gap between the two sections. Carrier 52 is inserted into this gap. When alignment is achieved, pressure is released and section 87 returns to its original position, closing the gap and fixing the position of carrier 52.

Solder may also be used in the slot. As the solder cools, it contracts and pulls the opposing surfaces together to apply force to carrier 52 and fix it in position. In such an instance, the distance between the opposing surfaces of sections 87 and 88 can be a few microns wider than the thickness of carrier 52, facilitating manipulation of carrier 52. As the solder cools, the slot will be pulled together along the Z axis, applying holding force to carrier 52.

We claim:

1. A method for aligning an optical fiber with an optical component mounted on a base, said method comprising:
    establishing a first position of support for said optical fiber so as to achieve a substantially optimum alignment of a first end of said optical fiber with said optical component, and
    establishing a second position of support for said optical fiber so as to refine the alignment of said first end with said optical component,
wherein said first position of support is closer to said optical component than said second position of support.

2. A method according to claim 1 wherein said first position of support is provided by a first support member having an opening through which said optical fiber passes, wherein said opening has an area greater than the cross-sectional area of said optical fiber, and wherein said substantially optimum alignment is achieved by moving said optical fiber within said opening.

3. A method according to claim 1 wherein the establishment of said first position of support comprises fixing a carrier of said optical fiber to a surface that is substantially orthogonal to the optical axis of said optical fiber.

4. A method according to claim 3 wherein said surface is on a wall of a slot formed in a support member mounted on said base.

5. A method according to claim 4 wherein said fixing is accomplished by soldering said carrier to said surface.

6. A method according to claim 4 wherein opposing walls of said slot are open prior to establishing said first position and said fixing is accomplished by closing said opposing walls.

7. A method according to claim 1 that further comprises mounting said optical component and a first support member on said base, wherein said first support member has an opening through which said optical fiber passes and which provides said first position of support.

8. A method for aligning an optical fiber with an optical component mounted on a base, said method comprising:
    passing said optical fiber through an opening of a support member mounted on said base,
    moving said optical fiber within the extent of said opening so as to achieve a position of support providing a substantially optimum alignment of a first end of said optical fiber with said optical component, and
    fixing said optical fiber to said support member.

9. A method according to claim 8 wherein said fixing causes said position of support to shift slightly in a direction that is substantially collinear with the optical axis of said optical fiber.

10. A method according to claim 8 wherein said fixing comprises fixing a carrier of said optical fiber to a surface of said support member that is substantially orthogonal to the optical axis of said optical fiber.

11. A method according to claim 10 wherein said surface is on a wall of a slot formed in said support member.

12. A method according to claim 11 wherein said fixing is accomplished by soldering said carrier to said surface.

13. A method according to claim 11 wherein opposing walls of said slot are open prior to establishing said position and said fixing is accomplished by closing said opposing walls.

14. A method for aligning an optical fiber with an optical component mounted on a base, said method comprising:
    moving said optical fiber so as to achieve a position of support providing a substantially optimum alignment of a first end of said optical fiber with said optical component, and
    fixing said position of support in a manner that any shift in said position occurs in a direction that is substantially collinear with the optical axis of said optical fiber.

15. A method according to claim 14 wherein said fixing comprises bonding a carrier of said optical fiber to a surface this is substantially orthogonal to the optical axis of said optical fiber.

16. A method according to claim 15 wherein said fixing is accomplished by soldering said carrier to said surface.

17. A method according to claim 15 wherein said surface is on a wall of a slot formed in a support member mounted on said base, opposing walls of said slot are open prior to establishing said position, and said fixing is accomplished by closing said opposing walls.

18. A device comprising:
    a base carrying an optical component and a support member, and
    an optical fiber having a diameter, an optical axis and a first end, said optical fiber being supported by said support member and having said first end held in proximity to and in alignment with said optical component, wherein said support member grips said optical fiber within an interval along said optical fiber less than or equal to about onethird the diameter of said fiber.

19. A device according to claim 18 wherein said support member has height, width and thickness, said thickness being along the optical axis of said optical fiber and being significantly smaller that either said width or said height.

20. A device according to claim 18 wherein said support member has a surface attached to a carrier of said optical fiber, wherein said surface is substantially orthogonal to the optical axis of said optical fiber.

21. A device according to claim 20 wherein said surface is a wall of a slot formed in said support member.

22. A device according to claim 21 wherein said carrier is attached to said surface by solder.

23. A device according to claim 21 wherein said carrier is attached to said surface by a force exerted by an opposite wall of said slot.

24. A device comprising:

a base carrying an optical component, a first support member and a second support member, and an optical fiber pivotally supported at said first support member and supported at said second support member such that a first end of said optical fiber is held in proximity to and in alignment with said optical component.

25. A device according to claim 24 wherein said optical fiber is gripped at said first support member by elastic members that exert a force on said optical fiber in a direction substantially orthogonal to the optical axis of said optical fiber.

26. A device according to claim 25 wherein said elastic members are formed in an elastic layer formed on a surface of said first support member.

27. A device according to claim 24 wherein said first support member has a surface attached to a carrier of said optical fiber, wherein said surface is substantially orthogonal to the optical axis of said optical fiber.

28. A device according to claim 27 wherein said surface is a wall of a slot formed in said first support member.

29. A device according to claim 28 wherein said carrier is attached to said surface by solder.

30. A device according to claim 28 wherein said carrier is attached to said surface by a force exerted by an opposite wall of said slot.

31. A device comprising:

a base carrying an optical component and a support member, and an optical fiber supported by said support member such that a first end of said optical fiber is held in proximity to and in alignment with said optical component, wherein said optical fiber is attached to a carrier having a height, width and thickness, said thickness being along the optical axis of said optical fiber and being significantly smaller that either said width or said height, and wherein said carrier is bonded to a surface of said support member, said surface being substantially orthogonal to the optical axis of said optical fiber.

32. A device according to claim 31 wherein said carrier comprises elastic members that exert a force on said optical fiber in a direction substantially orthogonal to the optical axis of said optical fiber.

33. A device according to claim 32 wherein said elastic members are formed in an elastic layer formed on a surface of said support member.

34. A device according to claim 31 wherein said surface is a wall of a slot formed in said support member.

35. A device according to claim 34 wherein said carrier is attached to said surface by solder.

36. A device according to claim 34 wherein said carrier is attached to said surface by a force exerted by an opposite wall of said slot.

\* \* \* \* \*